United States Patent [19]

D'agnolo

[11] Patent Number: 4,955,782
[45] Date of Patent: Sep. 11, 1990

[54] DEVICE TO PALLETIZE YARN PACKAGES

[75] Inventor: Armando D'agnolo, Porcia, Italy

[73] Assignee: Matics SrL, Pordenone, Italy

[21] Appl. No.: 327,786

[22] Filed: Mar. 23, 1989

[30] Foreign Application Priority Data

Apr. 18, 1988 [IT] Italy ................. 83366 A/88

[51] Int. Cl.⁵ .................. B65G 61/00; B65G 57/04; B65G 57/24
[52] U.S. Cl. .................. 414/789.5; 414/789.7; 414/792.9; 414/793.6; 414/794.4; 414/911; 414/927
[58] Field of Search ............ 414/792.9, 789.7, 789.5, 414/794.4, 793.6, 908, 911, 927; 57/281

[56] References Cited

U.S. PATENT DOCUMENTS

| | | | |
|---|---|---|---|
| 3,924,762 | 12/1975 | Igel | 57/281 X |
| 4,153,211 | 5/1979 | Lenk et al. | 414/911 X |
| 4,474,525 | 10/1984 | Murao | 414/331 |
| 4,555,215 | 11/1985 | Raasch et al. | 414/911 X |
| 4,669,942 | 6/1987 | Nagasawa | 414/908 X |
| 4,809,965 | 3/1989 | Meek et al. | 414/789.5 X |
| 4,810,155 | 3/1989 | D'Agndo | 414/911 X |

FOREIGN PATENT DOCUMENTS

| | | |
|---|---|---|
| 2300838 | 7/1974 | Fed. Rep. of Germany ........ 68/210 |
| 2347926 | 4/1975 | Fed. Rep. of Germany . |
| 3244925 | 6/1984 | Fed. Rep. of Germany . |
| 3630904 | 4/1987 | Fed. Rep. of Germany . |
| 3706871 | 9/1987 | Fed. Rep. of Germany . |
| 833224A87 | 3/1987 | Italy . |
| 1191533 | 3/1988 | Italy . |

OTHER PUBLICATIONS

Patent Abstracts of Japan, vol. 11, No. 278 (M-623) [2725], 9th Sep. 1987; & JP-A-62 79 168 (Murata Mach Ltd), 11-04-1987.
Patent Abstracts of Japan, vol. 1, No. 154, 9th Dec. 1977, p. 5578 M 77; & JP-A-52 97 884 (Teijin K. K.), 17-08-1977.
Melliand Textilberichte, International Textile Reports, vol. 65, No. 8, Aug. 1984, pp. 501–505, Würzburg, DE; J. Derichs "Technische Vorasussetzungen für den bedienungsarmen Betrieb einer Spinnerei".

Primary Examiner—Sherman Basinger
Attorney, Agent, or Firm—Wegner & Bretschneider

[57] ABSTRACT

A device to palletize yarn packages is a device which may be installed downstream from yarn package production machines such as winding machines, speed frames, finishing machines, open-end spinning machines, and two-for-one twisting frames. The yarn packages are taken substantially at the outlet of the production machine and are loaded in an orderly manner onto pallets to form pallet loads. The device includes a substantially horizontal conveyor for transferring yarn packages, a delivery head substantially in line with the conveyor, an elevator for taking yarn packages to a required level, an overturning device for orienting the yarn packages, a positioner conveyor, a movable trolley and a device which engages, handles and positions cartons and pallets.

21 Claims, 3 Drawing Sheets

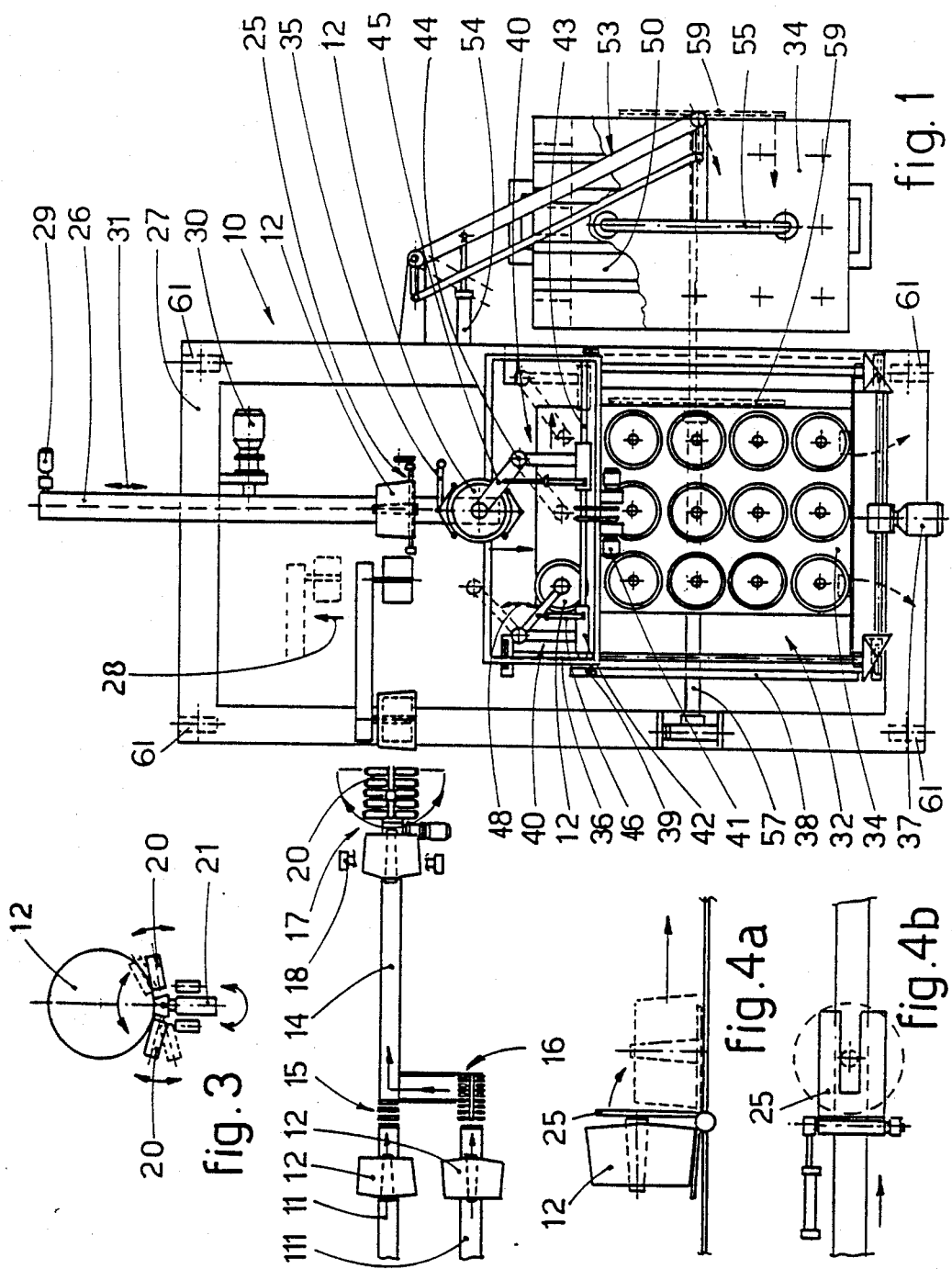

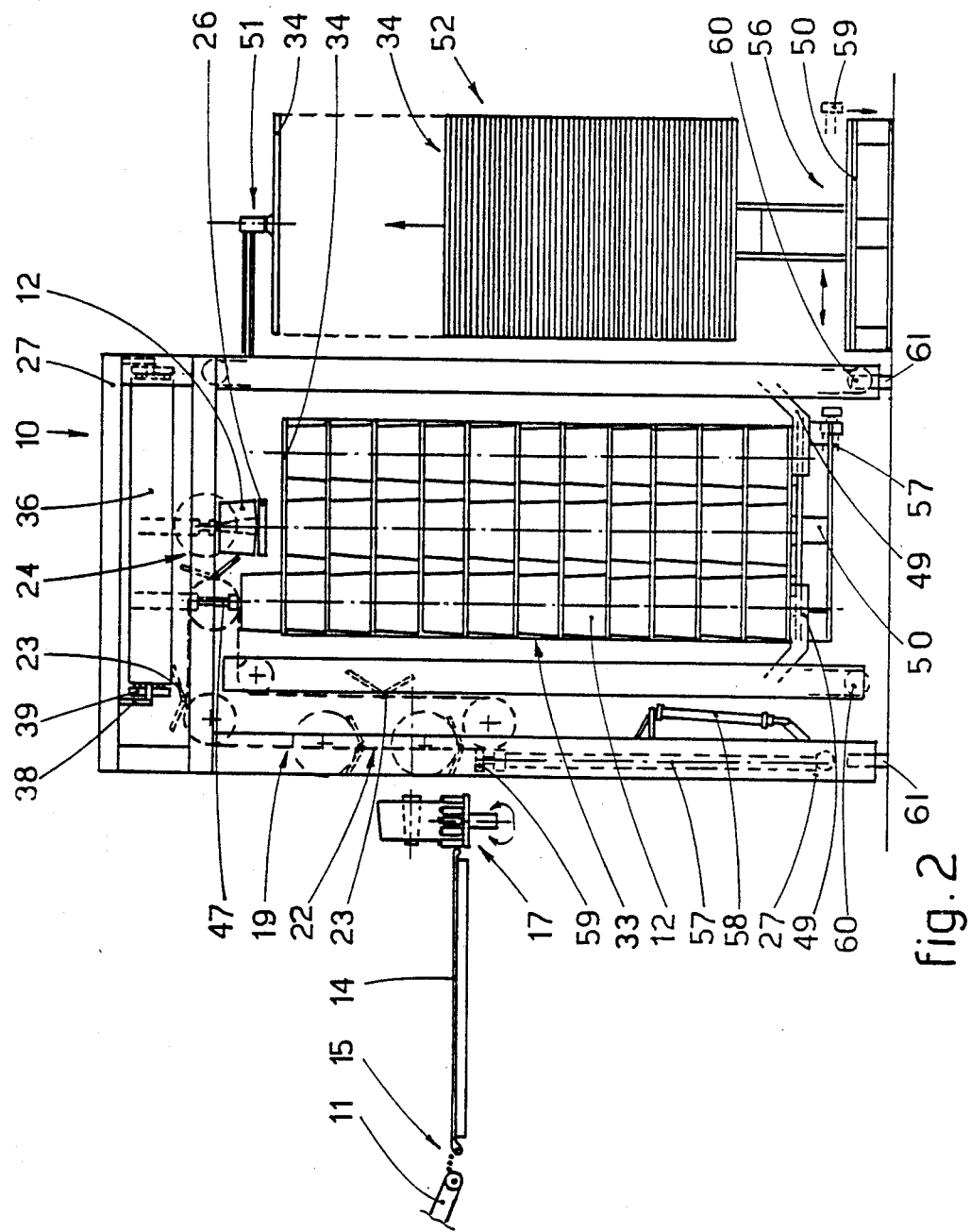

DEVICE TO PALLETIZE YARN PACKAGES

BACKGROUND OF THE INVENTION

This invention concerns a device to palletize yarn packages, which is suitable for installation downstream of yarn package production machines such as winding machines, speed frames, high-draft finishing machines, open-end spinning machines, two-for-one twisting frames, bobbin winders and take-up heads for synthetic yarn.

Such yarn packages may consist of yarn of continuous fibres such as manmade fibres for instance, or of yarn of discontinuous fibres such as wool, cotton, etc.

To be more exact, the invention concerns a device suitable to transfer yarn packages from their production machine and to load them in an orderly manner on pallets.

The loading on pallets may take place at the position where the yarn packages are taken from the production machine or at a central packing station by taking the yarn packages arriving from the production machines on suitable transfer means.

The words "yarn packages" or "packages" are used here as a generic name for any type of package of yarn or sliver wound normally in cylindrical or truncated-cone packages as the invention is suitable for all applications like those cited.

It is known that yarn packages in the textile industry are handled by means of creels, shaft-type supports, pallets, etc.

The packages are taken from the production machine and generally stored momentarily on supports either by hand or by robots, which take one or more packages at a time and deliver them to a provisional support.

The yarn packages are conveyed thereafter to successive processing departments where they are removed from the provisional support.

There are cases where the yarn packages require final packing at the production machine since they are required for despatch and it is necessary to position them on pallets.

Problems linked to the taking and delivery of yarn packages are known with regard to their weight and the relative costs.

DE 3.244.925 discloses a robot device which works to-and-fro, taking one or more yarn packages at a time and delivering them to the pins of a creel. On each occasion this robot has to repeat all the movements and all the positionings with relatively long working times.

Moreover, the employment of this robot is subject to structural limitations since creels which are too long or too high entail such burdensome downtimes that this device becomes unworkable.

Furthermore, the reciprocal positioning of the production machine, robot device and creel or transient support or momentary storage point has to be very accurate since otherwise the whole assembly will be unworkable.

Besides, the robot device requires the use of complex systems for programming, control and linking and therefore high costs of manufacture, operation and maintenance.

DE 2.347.926 discloses a mechanical device specifically applicable to cops, which, however, entails problems of not being applicable to cones or bobbins and of the specific particular nature of the equipment as a function of such employment and also of the downtimes required for taking and positioning the cops since the device has to be positioned vertically and transversely on each occasion.

These embodiments entail anomalous and unnatural movements since in any event there must always be a substantially useless return movement involving a downtime.

The problem of engaging the yarn packages internally or externally with devices of the type cited is also known. Such engagement requires engagement means with their relative actuators and suitable control means.

IT 83325 A/86 of the present applicant discloses embodiments suitable to overcome the problems cited above, but the device disclosed is applied substantially to the loading of momentary storage points in general, that is to say, it is not intended to serve one specific type of support such as a pallet unless it is provided with expensive, complicated individual arrangements, which in any event cannot be compared functionally to a specifically provided device.

IT 83324 A/87 belonging to the present applicant discloses a method for loading yarn packages on transient storage points whereby the presence of the transient storage point is verified and the required position for loading a yarn package on the storage point is identified.

SUMMARY OF THE INVENTION

The present applicant has designed, tested and embodied a device suitable to handle textile yarn packages so as to position them in an orderly manner in superimposed layers on a pallet.

The invention is set forth in the main claim, while the dependent claims show various features.

The present applicant intends to achieve a plurality of purposes with resulting advantages, amongst which we can indicate the following:

the creation of a swift device that reduces to a minimum the downtimes due to positioning the yarn package to be palletized and the seat where the yarn package is to be placed;

the maximization of use of the space of all the coordinates and the minimization of movements;

the ability to optimize the lay-out in the yarn package production area by providing a device able to work rationally on pallet loads being formed, completed pallet loads and on the materials constituting the pallets (cardboard boxes and wooden pallets) as well as the yarn packages coming from the production machines;

the ability to eliminate complicated memory, control and programming structures, with a resulting simplification of construction, operation and maintenance;

the embodiment of a compact device of a small overall bulk having ample working flexibility at the same time;

the ability to check the yarn packages before they are stored;

the ability to carry out auxiliary operations on the yarn packages before they are stored;

the ability to align quickly and easily the seat where the yarn package is to be placed.

These and other purposes together with the relative advantages besides yet further advantages will be made clear hereinafter.

The invention arranges to transfer the yarn packages discharged from the production machines to the palletization area by means of a coordinated conveyor system consisting of such elements as belts, chains, tracked means or equivalent means.

The device may be stationary and be positioned in a zone intended for making up pallet loads; in this case it will receive the yarn packages from the production machines by means of suitable conveyor means in suitable sequences.

According to a preferred embodiment, to which we shall refer hereinafter, the device can move and, in that case, can serve several yarn package production machines.

The yarn packages are taken at the outlet of the production machines and are delivered, properly positioned and oriented, directly to the pallet on which the yarn packages are arranged at required places according to a pre-set logic after having been possibly checked and/or treated.

According to one embodiment of the invention a conveyor is comprised downstream of the production machine and receives the yarn packages produced and transfers them to the actual palletization device.

This transfer conveyor can form part of the production machine and in that case will be installed in coordination therewith in the discharge area of each production machine.

Advantageously the transfer conveyor can form part of the device of the invention and in that case will be specially prepared for the type of production machine which it has to service. As an example, if it is intended to service open-end spinning machines equipped with two conveyor belts to discharge yarn packages, it will be conformed to accept the yarn packages from the two discharge conveyor belts at one and the same time but according to desired sequences.

After having undergone the required checks, the yarn packages pass from the transfer conveyor onto an orientation-overturning element and thence onto an elevator to be taken to the desired vertical levels, which will be different from the vertical level of the conveyor.

The yarn packages are transferred from the elevator onto a positioner conveyor, which has a suitable lengthwise development and lies substantially on a horizontal plane.

During this transfer the yarn packages, which so far have been moved with their axis substantially horizontal, may be rotated by 90° so as to move with a substantially vertical axis. However, this rotation by 90° may take place at another position, for instance at the terminal portion of the positioner conveyor.

The positioner conveyor is connected at its end to a trolley structure, the assembly of the positioner conveyor and of the trolley being movable at a right angle to the lengthwise axis of the yarn package production machine on the horizontal plane on which the assembly lies.

The assembly is positioned on the plane of the layer of yarn packages being formed on the pallet, and its lengthwise axis corresponds advantageously with the axis of the lengthwise centreline of the surface of loading on the pallet.

Such a lay-out enables the maximum saving of time in depositing each yarn package and of space required for the depositing to be obtained.

The displacement of the positioner conveyor, and therefore of the point of receipt of yarn packages, together with the trolley connected thereto, according to the axis of the centreline of the loading surface provides the lengthwise coordinate for loading the yarn packages.

The transverse coordinate of the loading position is obtained by means of at least one head, supported on the trolley, for depositing yarn packages.

This head, which alternatively may consist of two heads, moves from a suitable inactive position to engage yarn packages positioned at the end of the positioner conveyor, lifts them and takes them to the desired positioning for depositing on a cardboard carton, deposits them and then returns to its inactive position.

A positioner conveyor of a suitable length can serve two neighbouring production machines from one and the same position without having of necessity to displace the palletization device. This can be achieved by arranging for the transfer conveyor and elevator, which in this case belong to the device, to be able to move in relation and parallel to the positioner conveyor.

This enables the yarn packages collected from the production machines to be transferred at different points on the positioner conveyor.

This ability is of great importance where the device has to palletize the yarn packages of two production machines placed side by side with their working sides facing each other two by two, for instance automatic winding machines of spin winder plants with very limited distances between centres and with differentiated products.

When it is necessary to work on yarn packages stored downstream of the production machines and when in such storage areas there are generally at least one pallet being loaded and possibly also a full pallet together with a stock of cartons and pallets, there is not enough lengthwise space between the two discharge points to position the device at the same distance from all the machines.

The displacement of the transfer conveyor obviates this problem and enables yarn packages to be taken from different relative positions of the machines and pallets being loaded.

The search for the loading position on the loading surface of the pallet can be conducted according to the methods disclosed in the cited IT 83324 A/87 of the present applicant.

As is known, a pallet load of yarn packages consists of a pallet, generally wooden, on which are positioned orderly superimposed layers of yarn packages separated by cardboard cartons.

The device performs the first placement of yarn packages on the wooden pallet by starting at a vertically higher working position and then descends by a level corresponding to one layer of yarn packages whenever one of the layers is complete.

When discharge from the winding machine has been carried out, the device places on the ground the loaded pallet. Having done so, the device moves to the next working position at a successive production machine.

If a pallet is completed during loading, the device places it on the ground in the allotted area.

The device of the invention is provided with means suitable to engage and position suitably the wooden pallets held in appropriate storage points in correspondence with the discharges of the production machines.

Likewise, the device of the invention is provided with means suitable to take and position the cardboard cartons which have to be placed between one layer of yarn packages and another, the cartons being held in storage points like those of the wooden pallets.

The pallets are loaded, as we said earlier, by making the loading surfaces correspond with the lengthwise positioner conveyor and by moving vertically the pallet being loaded.

According to a variant the device carries on itself a stock of cartons for pallets.

According to a further variant the device carries on itself a stock of wooden pallets.

The device makes possible various operating methods linked either to the different types of lay-out required or to possible different characteristics of the yarn packages produced.

For instance, if the yarn packages produced by different machines in one and the same production shop consist of yarns of different characteristics, it is advantageous to load the pallet at each production machine at which a space is provided for pallets being loaded, pallets already loaded and stocks of empty pallets and cartons.

In this case cartons for pallets are provided, as also are differentiated programmes for depositing the yarn packages on the cartons, for instance, as a function of the different diameters of the yarn packages processed on one machine and another.

Among the operating methods according to the invention there are also some possible variants linked to the quantities of yarn packages processed on each occasion that the device halts at a production machine.

Hitherto, in substance, we have considered the situation in which at each halt the device loads only a part of the pallet since it has available only a part of the total number of yarn packages provided for in a full pallet load.

There is also a possible situation in which the device has at its disposal the total number of yarn packages to fill a pallet, this being the case particularly in plants containing open-end spinning machines.

In this situation the pallet will be fully loaded during the period of the halt near the production machine and will be discharged by the device in a storage point near the production machine or will be borne by the device to an appropriately arranged storage point farther away. In this case the device can be provided advantageously with its own stock of wooden pallets and cartons.

If the yarn packages to be palletized in one production shop are all the same as each other, each pallet can be moved by the device until it has been fully loaded and can then be discharged at appropriately allotted sites.

The device, which will also be of a movable type, can also be located in a storage point separate from the yarn package production zone, the yarn packages processed by several production machines being brought to that point on suitable conveyor means.

BRIEF DESCRIPTION OF THE DRAWINGS

The attached figures, which are given as a non-restrictive example, show the following:

FIG. 1 gives a diagram of a plan view of a device according to the invention;

FIG. 2 is a diagrammatic vertical elevation of the device of FIG. 1;

FIG. 3 shows a diagram of a detail of the device of FIG. 1;

FIGS. 4a and 4b give a side view and a plan view respectively of a detail of the device of FIG. 1;

DETAILED DESCRIPTION OF THE PREFERRED EMBODIMENTS

Figure 5:
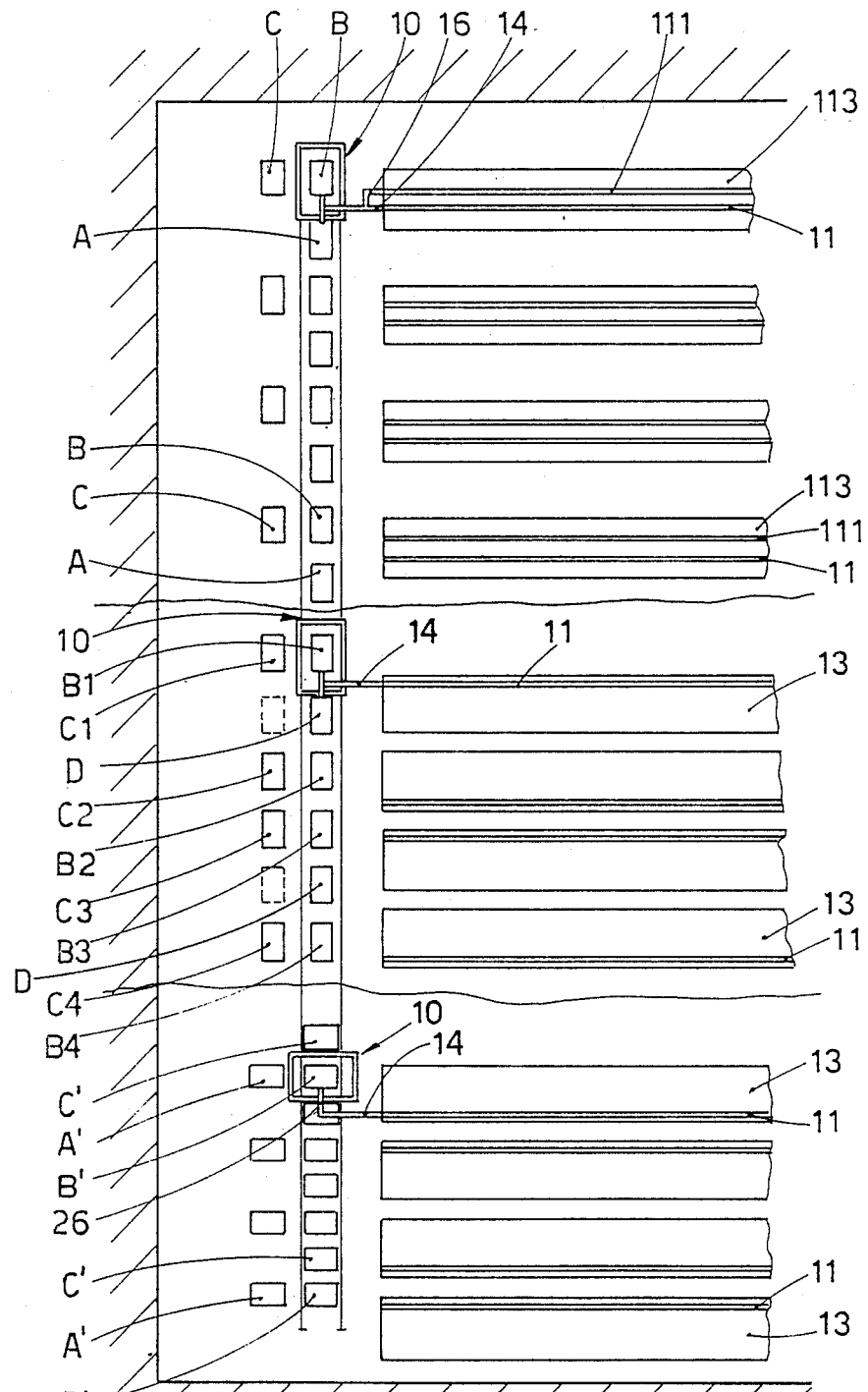
FIG. 5 gives a plan view of three solutions of a plant employing the device according to the invention.

In the figures a device to palletize yarn packages according to the invention is positioned immediately downstream of yarn package production machines 13 and 113 and cooperates with the discharge 11 of the yarn packages 12 of those machines 13–113, which are shown diagrammatically in FIG. 5 and in this example represent automatic winding machines 13 and open-end spinning machines 113 but can be of any desired type.

Two discharges 11 and 111 are comprised in the case of an open-end spinning machine, each discharge serving one side of the machine since it is generally necessary to have to remove simultaneously the yarn packages 12 deposited on those discharges 11 and 111 as soon as they have been processed.

The yarn packages 12 of the discharge conveyor belt 11 belonging to the production machines 13 are carried to the palletization device 10 on a transfer conveyor 14 which cooperates with the discharge conveyor 11, for instance, by means of a roller conveyor 15.

If there are two discharge conveyors 11–111, the yarn packages 12 on both of them are delivered in the same way to the transfer conveyor 14 by a collection and switch means 16.

Suitable control and coordination means control an orderly flow of yarn packages 12 from the discharge conveyors 11–111 to the transfer conveyor 14.

At the end of the transfer conveyor 14 and before passing to a delivery head 17, the yarn packages 12, if necessary or so required, can be processed and/or checked in a station 18, in which their diameter and/or weight and/or their orientation on the transfer conveyor 14 can be checked.

The transfer conveyor 14 and the possible collection and switch means 16 can belong to each single production machine 13, but according to a preferred embodiment of the invention they will form an integral part of the palletization device 10 and will be positioned on each occasion at the discharges 11–111 of the production machine 13–113 being served at that time by the movable palletization device 10, being caused to retract within the overall bulk of the device 10 during movement from one working position to another. The frame 27 of the movable palletization device 10 is provided with a plurality of wheels 61 to facilitate the movement thereof.

The delivery head 17 rotates the axis of the yarn packages by 90° and then has the task of transferring them to an elevator 19. The rotation by 90° may be clockwise or anticlockwise, depending on the indications received from the checking station 18 and on the type of production machine, whether a righthand or lefthand control machine for instance, so as to orient all the yarn packages 12 in the same direction, whether they be conical or cylindrical.

The delivery head 17 is advantageously a head with rolls 20 fitted to a rotary support 21 (see FIG. 3), each row of rolls 20 being tiltable (position shown with dashes in FIG. 3) so as to discharge the yarn packages 12 sideways onto the successive elevator 19.

The elevator 19 consists advantageously of a chain or belt 22 and extends along a vertical segment and a horizontal segment in relation to the device 10; seatings 23 are supported on the elevator 19 and are shaped and controlled suitably to accept and deliver the yarn packages 12.

At the end part of its horizontal chain or belt segment 22 (position 24 in FIG. 2) the elevator 19 transfers the yarn package 12 onto an overturning means 25 (FIGS. 4a and 4b) suitable to position the axis of the yarn package 12 vertically by a rotation of 90°.

The overturning means 25 works at a position above a horizontal positioner conveyor belt 26 and is conformed in such a way that it discharges the yarn packages 12, when overturned, onto the positioner conveyor 26.

The vertical positioning of the axis of the yarn packages 12 can be achieved at another position too, for instance at the end part of the positioner conveyor 26.

The overturning means 25, elevator 19, delivery head 17 and possibly the linked transfer conveyor 14 may form part advantageously of a structure able to move in relation to a frame 27 of the device 10 and suitable to be displaced on a horizontal plane in the direction of the arrow 28 in FIG. 1.

In this way it is possible to obtain a plurality of positions to discharge the yarn packages 12 on the positioner conveyor 26.

The positioner conveyor 26 is equipped with a first motor 29 to feed the yarn packages 12 placed on the positioner conveyor 26 and also a second motor 30 for the lengthwise reciprocating movement of the positioner conveyor 26 according to the arrow 31.

This lengthwise movement takes place along a trajectory coinciding with the axis of the centreline of each loading surface 32 of the pallet 33 being loaded, the loading surface 32 consisting of a cardboard carton 34 or equivalent material, while the positioner conveyor 26 is displaced at a required distance above that surface.

A trolley 36 is connected frontally to the positioner conveyor 26 and can move therewith by means of wheels 39 in guides 38 through the action of the second motor 30.

The position for loading a yarn package 12 is found according to a determined logic in cooperation with suitable position sensors, the logic being a function of the various possible methods of working of the palletization device 10.

The positioner conveyor 26 comprises terminally an assembly, bearing the reference 35 in FIG. 1, for alignment of yarn packages 12; this assembly 35 enables each yarn package 12 to be correctly positioned before being taken to the loading surface 32.

The movable trolley 36 includes one or two heads 40 to deposit yarn packages, these heads forming the transverse coordinate for depositing yarn packages on the loading surface 32.

The depositing head 40 comprises its own transverse actuation means 41, which are suitably operated and arrange the sideways movement of a slider 42 on a crosswise shaft 43, an arm 45 pivoted at 44 being connected to the slider 42.

The arm 45, which is oscillated by a jack 46 about the pivot 44, bears at its end an assembly 47 to engage a yarn package 12; the assembly 47 descends, engages the yarn package, ascends and is rotated about the pivot 44 by an angular value 48 such as will bring the yarn package 12 to the required position above the carton 34; the assembly 47 then descends and releases the yarn package.

If there are two heads 40 to deposit yarn packages, they will work with staggered phases, thus reducing to a minimum the times for positioning the yarn packages 12 on the loading surface 32.

The depositing of yarn packages on the loading surface 32 begins advantageously at the position of maximum lengthwise travel of the positioner conveyor 26 and trolley 36; thereafter, when each row of yarn packages is completed, the positioner conveyor 26 and trolley 36 retreat by a programmed distance to start depositing a new row of yarn packages 12.

When a loading surface 32 is full, unless it is the last to be filled, a new loading surface has to be created. This is achieved by lowering the vertical position of the pallet 50 being loaded by a pre-set distance by means of a lifter means that moves the pallet 50, which is generally wooden.

The lifter means consists of gripper forks 49, which cooperate with the pallet 50 and are connected to lifting chains 60 driven by a third motor 37.

At the same time a carton engagement means 51 solidly fixed to the device 10 takes a carton 34 from a carton store 52 positioned in the neighbourhood of the working zone of the device 10 and transfers the carton 34 into the device 10 to form the new loading surface 32.

The carton engagement means 51 consists advantageously of a system of oscillatory levers 53 operated, for instance, by a jack 54 and bearing at its end an aspiration tube means 55 able to engage and lift one carton 34 at a time.

The carton engagement means 51 is made to slide vertically on the frame 27 so as to reach the first carton 34 in a store 52.

The beginning of loading a pallet is performed by the device 10 taking from a pallet store 56 the pallet required 50 and carrying it into the frame 27, where it is engaged by the gripper forks 49.

The obtaining of the necessary pallet 50 is carried out by an assembly contained in the device 10 and consisting of an oscillatory shaft 57 with a relative rotation control 58; the shaft 57 is positioned at first in the lower part of the device 10, then extends telescopically, for instance, in correspondence with the pallet 50 to be taken and thereafter descends with its terminal blade 59 to cooperate in towing the pallet 50 to the palletization position.

When a pallet load 33 has been completed in the loading position, it is borne by the device 10 to the position where it is to be deposited; then, if the discharge from the relative production machine has not been completed, the device 10 returns to its loading position to start loading another pallet 50. Thereafter it moves on to serve a new machine 13–113.

If in this new position it finds an incomplete pallet load 33, it will take the pallet in question to a position for loading yarn packages 12 and will re-start loading at the position previously left free by proceeding to search for that position according to a corresponding programme.

FIG. 5 shows three possible lay-outs, in the upper part of which is shown a storage zone serving a battery of open-end spinning machines 113; each store cooperating with the device 10 consists of a zone A of fully loaded pallets, a zone B for pallets being loaded and a zone C for stocks of cartons and wooden pallets arranged advantageously below the cartons; the pallets, whether loaded or not, and the cartons are positioned with their longer side crosswise to the axis of the machine 113.

The device 10 carries out palletization at B and then moves to A to discharge the loaded pallet 33; it then returns to B, takes a new pallet from C and starts loading a new pallet 50 if there are yarn packages 12 available.

One working variant arranges that all the yarn packages 12 discharged from the open-end spinning machines 113 are palletized on one single pallet. In this case the device 10 loads the pallet, deposits it in A and then moves to a new production machine 113, perhaps taking empty cartons and pallets with it.

The central embodiment of the organization in FIG. 5 shows the case of production machines such as automatic winding machines 13 of the type with right and left control, or of the type having all the control units on the same side although the machines have facing working sides arranged two by two.

This embodiment may be deemed critical from the point of view of availability of space between the machines, and therefore there may be a zone B1 for pallets being loaded and a zone for a stock of cartons and empty pallets C1 for the first machine 13, and analogous zones B2 and C2 for the second machine, a zone D of fully loaded pallets being interposed and being emptied from time to time by taking the loaded pallets to stay momentarily in the space marked with lines of dashes.

The same applies to the successive machines, namely the third and fourth in FIG. 5 with their zones B3 and C3, and B4 and C4, with a zone D interposed.

Cooperation between the lengthwise movement of the positioner conveyor and the transverse movement of the complex consisting of the transfer conveyor 14, delivery head 17, elevator 19 and overturning means 25 enables the yarn packages to be removed in this organizational lay-out.

The embodiment of the organization shown in the lower part of FIG. 5 illustrates a case where, with space available between the machines and the end of the production shop, the wholly or partly loaded pallets and the stocks of cartons 34 and empty pallets 50 are positioned with their long side parallel to the lengthwise axis of the machine 13.

In this lay-out each machine 13 has available a zone A' for depositing full pallets, a zone B' for pallets being loaded and a zone C' for stocks of cartons and empty pallets; the zones A' and C' may be interchanged.

These zones are positioned in such a way in relation to the discharges 11 of the production machines 13 that in this case too it is necessary to carry out the displacement of the elevator 19 and the connected assemblies according to the arrow 28 in relation to the positioner conveyor 26 in passing from one machine 13 to the next one.

What is claimed is:

1. Device to palletize yarn packages, which is suitable for installation downstream of yarn package production machines, the yarn packages being taken substantially at the outlet of the production machine and loaded in an orderly manner on pallets suitable to form pallet loads, the device comprising in working relationship on a frame:

a substantially horizontal conveyor to transfer yarn packages, which extends lengthwise parallel to the lengthwise axis of the production machine and cooperates with the package discharge of the production machine;

a delivery head substantially in line with the transfer conveyor and suitable to orient and transfer the yarn packages;

an elevator to take the yarn packages to a required vertical level above the horizontal plane on which the transfer conveyor lies;

an overturning means cooperating with the elevator and suitable to orient and transfer the yarn packages;

a substantially horizontal positioner conveyor for the yarn packages, which extends lengthwise at a right angle to the lengthwise axis of the production machine and forms the lengthwise coordinate for depositing the yarn packages on the pallet;

a movable trolley which is solidly fixed to the positioner conveyor and comprises at least one head to deposit yarn packages on the pallet, the trolley forming the transverse coordinate for depositing the yarn packages on the pallet; and means to engage, handle and position cartons and the pallets within the frame, the frame being able to move in a direction substantially at a right angle to the lengthwise axis of the yarn package production machines.

2. Device to palletize yarn packages as claimed in claim 1, in which the transfer conveyor cooperates with a collection and switch means.

3. Device to palletize yarn packages as claimed in claim 1, in which a processing station for the yarn packages is included on the transfer conveyor.

4. Device to palletize yarn packages as claimed in claim 1, in which the delivery head is able to rotate about a vertical axis.

5. Device to palletize yarn packages as claimed in claim 1, in which the elevator is a chain or belt including seatings to support yarn packages and extends along a vertical segment and a horizontal segment substantially parallel to the transfer conveyor.

6. Device to palletize yarn packages as claimed in claim 1, in which the overturning means is positioned above the positioner conveyor so as to be able to transfer yarn packages thereon.

7. Device to palletize yarn packages as claimed in claim 1, in which the transfer conveyor, delivery head, elevator and overturning means are able to move in coordination in a direction parallel to the lengthwise axis of the positioner conveyor and in relation thereto.

8. Device to palletize yarn packages as claimed in claim 1, in which the positioner conveyor and trolley are able to move lengthwise in a direction substantially at a right angle to the lengthwise axis of the production machines.

9. Device to palletize yarn packages as claimed in claim 1, in which the positioner conveyor and trolley follow a trajectory coinciding with the centreline of the loading surface of the pallet during their lengthwise movement.

10. Device to palletize yarn packages as claimed in claim 1, in which each head to deposit yarn packages is able to move at a right angle to the direction of movement of the positioner conveyor and trolley.

11. Device to palletize yarn packages as claimed in claim 1, in which the means to engage, handle and position pallets is an oscillatory shaft which can be positioned momentarily outside the frame to cooperate with a store of pallets.

12. Device to palletize yarn packages as claimed in claim 11, in which the means to engage, handle and position pallets are a gripper fork and a chain cooperating with the oscillatory shaft.

13. Device to palletize yarn packages as claimed in claim 11, in which the store of the pallets is solidly fixed to the frame.

14. Device to palletize yarn packages as claimed in claim 1, in which the means to engage, handle and position cartons is a carton engagement means positioned outside the frame and able to move vertically to cooperate with a store of cartons.

15. Device to palletize yarn packages as claimed in claim 14, in which the store of the cartons is solidly fixed to the frame.

16. Device to palletize yarn packages as claimed in claim 1, in which the means to engage cartons can be positioned momentarily inside the frame.

17. Device to palletize yarn packages as claimed in claim 1, in which during loading the pallet is located momentarily inside the frame.

18. Device to palletize yarn packages as claimed in claim 1, in which during loading the pallet is always located inside the frame.

19. Device to palletize yarn packages as claimed in claim 1, which cooperates with zones for the positioning of full pallets located downstream of each production machine.

20. Device to palletize yarn packages as claimed in claim 1, which cooperates with a central storage point for the positioning of full pallets.

21. Device to palletize yarn packages as claimed in claim 1, in which a checking station for the yarn packages is included on the transfer conveyor.

* * * * *